(12) United States Patent
Breed et al.

(10) Patent No.: US 11,508,249 B1
(45) Date of Patent: Nov. 22, 2022

(54) SECURE TESTING USING A SMARTPHONE

(71) Applicant: Intelligent Technologies International, Inc., Miami Beach, FL (US)

(72) Inventors: David S Breed, Miami Beach, FL (US); Oleksandr Shostak, Kyiv (UA); Wilbur E DuVall, Katy, TX (US); Wendell C Johnson, San Pedro, CA (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 936 days.

(21) Appl. No.: 16/290,529

(22) Filed: Mar. 1, 2019

Related U.S. Application Data

(60) Provisional application No. 62/638,406, filed on Mar. 5, 2018.

(51) Int. Cl.
  *G09B 7/00* (2006.01)
  *G09B 5/12* (2006.01)
  (Continued)

(52) U.S. Cl.
  CPC ......... *G09B 5/125* (2013.01); *G02B 27/0149* (2013.01); *G02B 27/0176* (2013.01);
  (Continued)

(58) Field of Classification Search
  CPC .............. G02B 27/017; G02B 27/0172; G02B 27/0176; G02B 27/01; G06F 3/04845;
  (Continued)

(56) References Cited

U.S. PATENT DOCUMENTS 6,319,034 B1  11/2001 Takakura et al.
7,065,656 B2  6/2006 Schwenck et al.
(Continued)

FOREIGN PATENT DOCUMENTS

JP  2017-156410 A  9/2017
WO  WO-2016028864 A1 *  2/2016  ......... G02B 27/0093
(Continued)

OTHER PUBLICATIONS

Search report for International Application No. PCT/US19/22951 dated Jun. 7, 2019.
(Continued)

*Primary Examiner* — Yuzhen Shen
(74) *Attorney, Agent, or Firm* — Brian Roffe

(57) ABSTRACT

Method for taking a test using a smartphone including placing the smartphone into connection with a device, placing the device on a head of a person with the smartphone in a position in which a display of the smartphone is visible to the person, coupling the smartphone to the device and displaying test questions on the display. Cheating is detected by, for example, monitoring presence of the device on the head of the person by periodically obtaining biometric data from the person and analyzing a change in the biometric data relative to previously obtained biometric data for the person, and when a change is present, stopping display of the test questions and generating and transmitting a communication to a test-providing institution derived from the change in biometric data.

20 Claims, 7 Drawing Sheets

(51) Int. Cl.
*G06F 21/32* (2013.01)
*G09B 5/02* (2006.01)
*G02B 27/01* (2006.01)
*G06V 40/18* (2022.01)

(52) U.S. Cl.
CPC ............ *G06F 21/32* (2013.01); *G06V 40/197* (2022.01); *G09B 5/02* (2013.01); *G09B 7/00* (2013.01); *G02B 2027/0154* (2013.01); *G02B 2027/0169* (2013.01)

(58) Field of Classification Search
CPC ......... G06F 21/78; G06F 3/013; G09B 5/125; G09B 5/12; G09B 5/00; G09B 7/00; G09B 7/07; G06V 40/197
See application file for complete search history.

(56) References Cited

U.S. PATENT DOCUMENTS

| | | | |
|---|---|---|---|
| 7,257,557 B2 * | 8/2007 | Hulick | H04L 9/3231 434/354 |
| 8,957,835 B2 | 2/2015 | Hoellwarth | |
| 9,076,048 B2 | 7/2015 | Shubinsky et al. | |
| 9,176,325 B2 | 11/2015 | Lyons | |
| 9,274,340 B2 | 3/2016 | Lyons | |
| 9,377,626 B2 | 6/2016 | Lyons | |
| 9,429,759 B2 | 8/2016 | Hoellwarth | |
| D792,398 S | 7/2017 | Costa et al. | |
| D800,113 S | 10/2017 | Wessman | |
| 9,779,555 B2 | 10/2017 | Chang et al. | |
| 9,804,393 B1 | 10/2017 | Coz et al. | |
| 9,804,401 B2 | 10/2017 | Choi | |
| 9,857,595 B2 | 1/2018 | Costa et al. | |
| 9,864,202 B1 | 1/2018 | Wallen | |
| 9,872,968 B2 | 1/2018 | De Zamboti et al. | |
| 9,881,422 B2 | 1/2018 | Chang et al. | |
| 9,897,818 B2 | 2/2018 | Haymond | |
| 9,971,937 B1 | 5/2018 | Ovsiannikov et al. | |
| 10,168,798 B2 | 1/2019 | Tsang | |
| 10,168,857 B2 | 1/2019 | Alnatsheh et al. | |
| 10,209,769 B2 | 2/2019 | Goossens et al. | |
| 10,684,654 B2 | 6/2020 | Shin et al. | |
| 10,778,956 B2 | 9/2020 | Lee | |
| 10,812,689 B2 * | 10/2020 | Widergren | H04R 1/1041 |
| 2003/0059078 A1 | 3/2003 | Downs, Jr. et al. | |
| 2015/0317464 A1 * | 11/2015 | Willis | G06V 40/197 348/78 |
| 2016/0005232 A1 | 1/2016 | Quarks | |
| 2016/0035233 A1 * | 2/2016 | Breed | G02B 27/017 324/658 |
| 2016/0334628 A1 * | 11/2016 | Lyons | G02B 27/0176 |
| 2017/0156965 A1 | 6/2017 | Geisinger et al. | |
| 2017/0185805 A1 | 6/2017 | Breed et al. | |
| 2017/0206708 A1 | 7/2017 | Gentilin et al. | |
| 2017/0213471 A1 * | 7/2017 | Breed | G02B 27/0172 |
| 2017/0255229 A1 | 9/2017 | Buckley | |
| 2018/0008141 A1 * | 1/2018 | Krueger | A61B 3/14 |
| 2018/0011333 A1 | 1/2018 | Ansaay | |
| 2018/0033199 A9 | 2/2018 | Eatedali et al. | |
| 2018/0074607 A1 | 3/2018 | Zhang et al. | |
| 2018/0075764 A1 | 3/2018 | Bachani et al. | |
| 2018/0077407 A1 | 3/2018 | Young | |
| 2018/0157333 A1 | 6/2018 | Ross et al. | |
| 2018/0158417 A1 * | 6/2018 | Xiang | G09G 3/3233 |
| 2018/0160105 A1 | 6/2018 | Ross et al. | |
| 2018/0192031 A1 | 7/2018 | Hardison | |
| 2018/0357916 A1 | 12/2018 | Breed et al. | |

FOREIGN PATENT DOCUMENTS

| | | |
|---|---|---|
| WO | 2016070248 A1 | 5/2016 |
| WO | 2018009427 A1 | 1/2018 |
| WO | 2018056749 A1 | 3/2018 |

OTHER PUBLICATIONS

Written opinion for International Application No. PCT/US19/22951 dated Jun. 7, 2019.

* cited by examiner

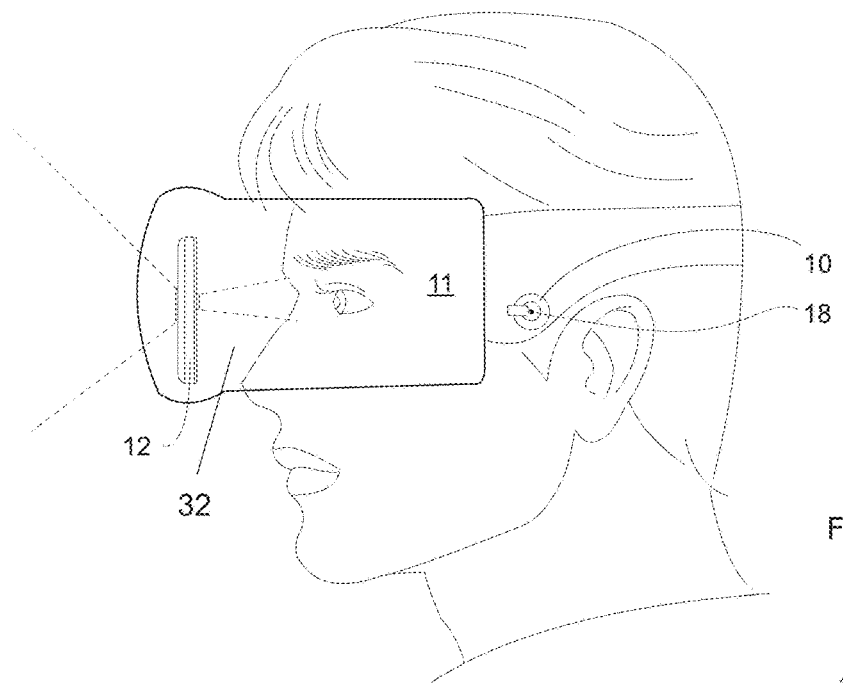
FIG. 1
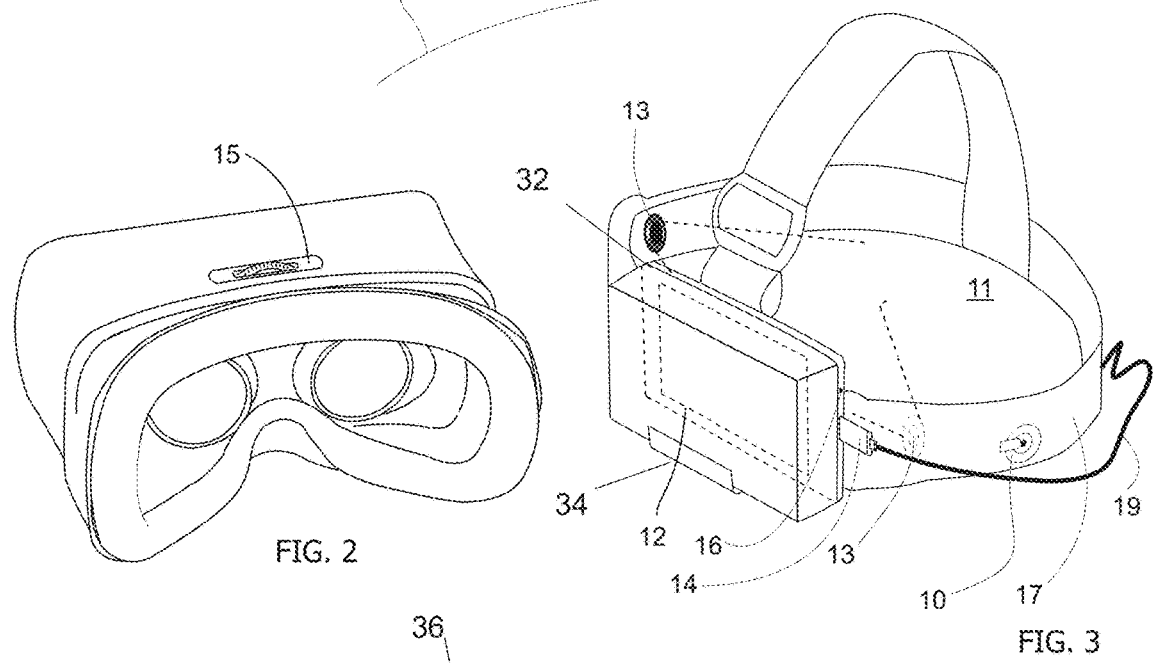
FIG. 2
FIG. 3
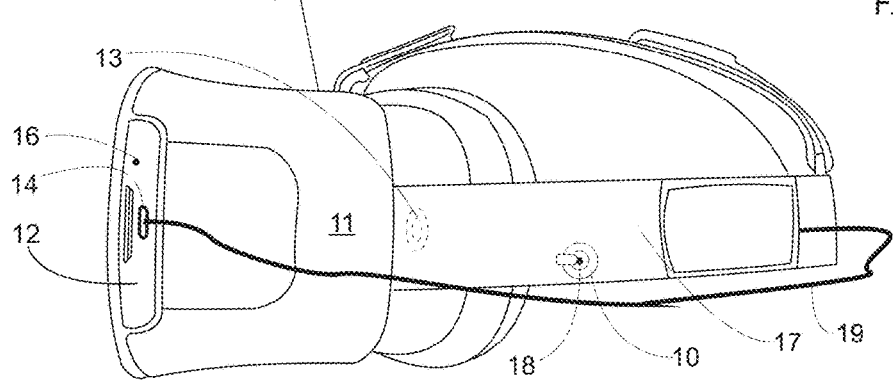
FIG. 4

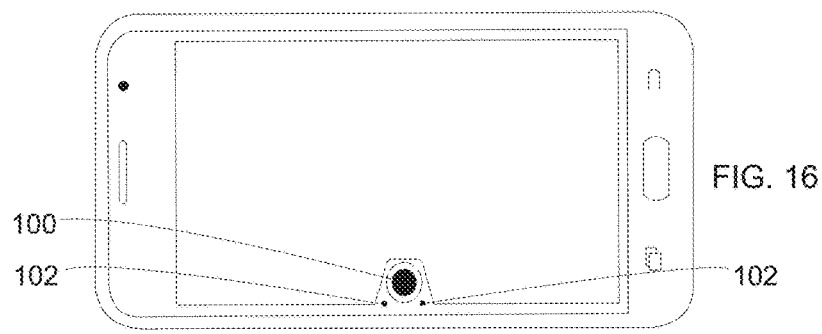
FIG. 16
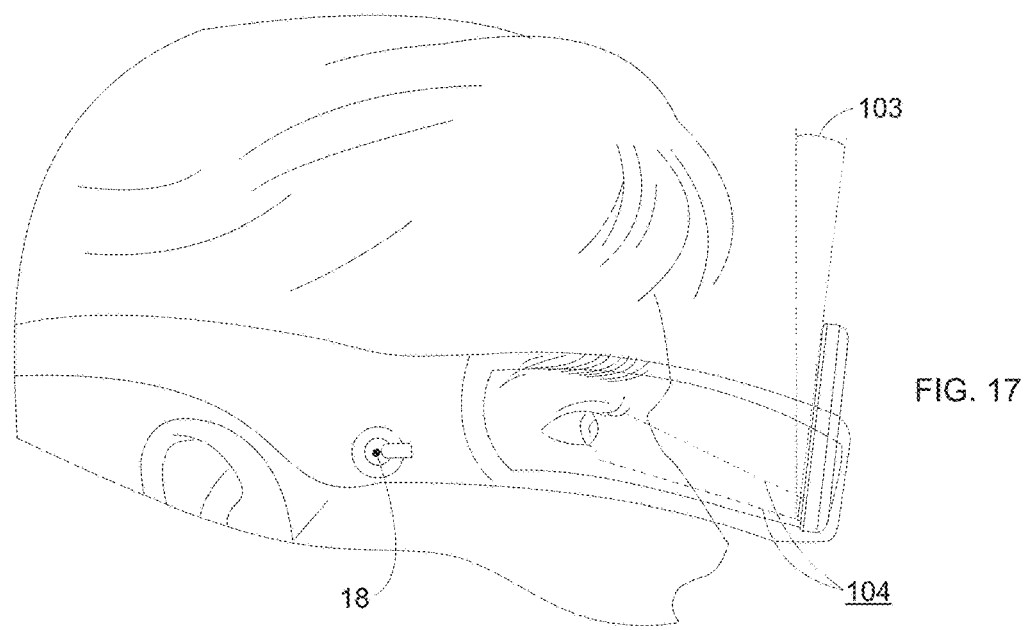
FIG. 17
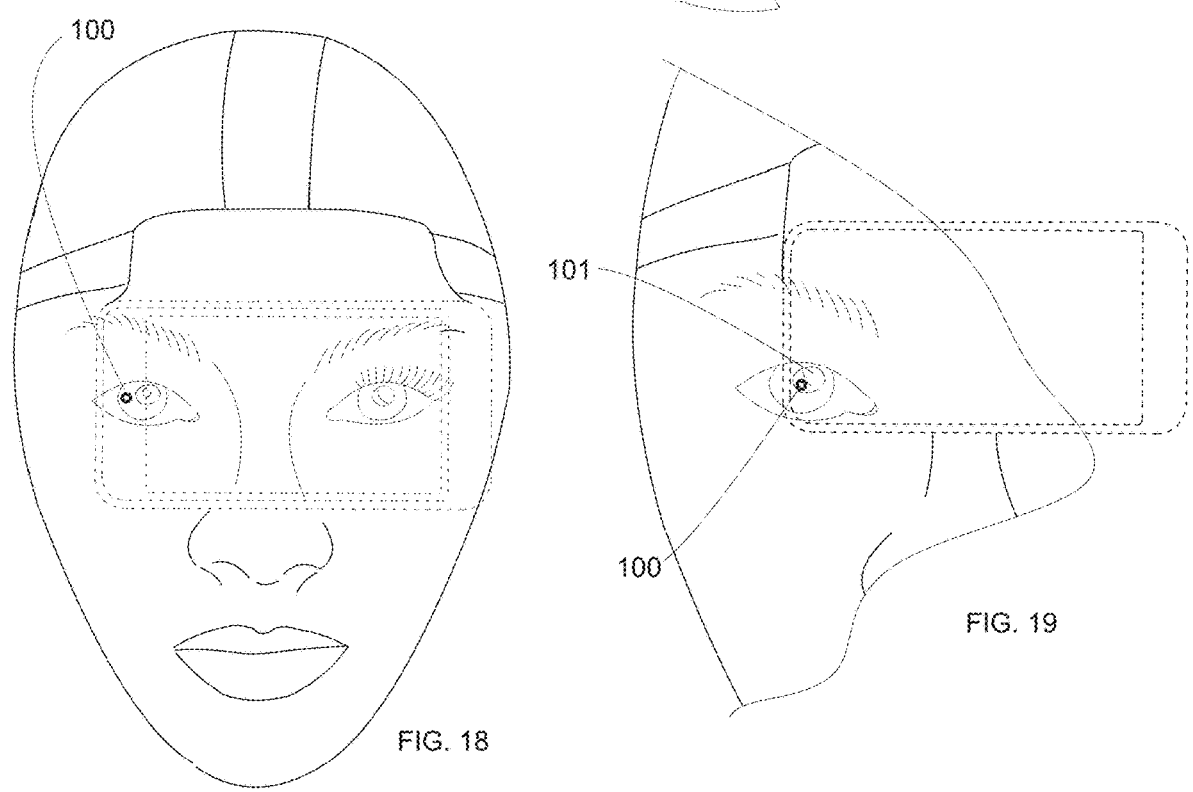
FIG. 18
FIG. 19

SECURE TESTING USING A SMARTPHONE

FIELD OF THE INVENTION

The present invention relates generally to the field of a computer-based system and method for taking a test while ensuring that the test-taker is not receiving assistance from another person or otherwise cheating while taking the test, and ensuring that a device being used for displaying or taking the test has not been breached and is not being breached or otherwise compromised. The present invention also relates to a wearable device that can, when a smartphone is secured to a frame of the device, be used for test-taking.

BACKGROUND OF THE INVENTION

There has been a great deal of discussion in the press over the past several years relating to MOOCs, Massive Open Online Courses. Using the Internet, education can be freely distributed to anyone who has Internet access. It is now generally recognized that mastery of almost any field taught in colleges and universities can be achieved by a motivated student without attending lectures at that college or university. Thus, the technology is in place for a student to obtain knowledge that has previously only been available to a campus-resident, matriculated student at a college, university or other institution, at virtually no cost.

In contrast, the cost of a traditional Massachusetts Institute of Technology (MIT) education, for example, resulting in a bachelor's degree can exceed two hundred thousand dollars. The only impediment which exists from preventing a university such as MIT from granting a degree to an online taught student is that the university needs to know with absolute certainty that the student did not cheat when taking various exams required to demonstrate mastery of the coursework. With a degree from MIT, for example, industry will hire such a person at a starting salary approaching or exceeding $100,000 per year. Thus, the value to the student is enormous. Since the information which must be mastered is now available for free on the Internet, the only impediment separating a motivated student from a high starting salary is that a degree-granting university must be certain that the student has demonstrated mastery of the material through successful completion of examinations without the assistance of a helper or consultant while taking the examinations.

Even when tests are administered in a classroom, it is well known that extensive cheating can occur. In China, for example, where admission to college is solely determined by the score that a student receives on a one-time test, the motivation to cheat is enormous.

OBJECTS AND SUMMARY OF THE INVENTION

The present invention is directed at solving the problem of guaranteeing with a high degree of certainty that a student taking a test is acting alone without the aid of a consultant or other helper, or otherwise cheating.

If a student, when taking a test, is inclined to cheat, this inclination can be facilitated if a helper or consultant has access to the display which shows the test while it is being taken. If the consultant has such access, then he or she will use a communication method by which he or she can transfer information to the test-taking student in a manner that cannot be detected. Embodiments of the invention minimize the opportunity of the consultant from observing the display or otherwise learning the content of the test questions and/or of being able to communicate with the test-taker.

An arrangement for test-taking for use with a computer in accordance with one embodiment of the invention includes a head wearable device which includes at least one sound sensor for detecting sound, at least one optical imaging device that obtains images of an area viewed by the student, a second optical imaging device which will image an iris of the student and a display which is only viewable by the test-taker. The display can be the display of a smartphone so that the head wearable device does not include a display unless it is retaining the smartphone. A processing unit which is embedded in the smartphone receives and analyzes data therefrom to determine whether the test-taker is interacting with another person and/or whether the test-taker is receiving communications from another person.

A headpiece in accordance with one embodiment of the invention includes a frame having a support portion adapted to be supported on a person's head and a viewable portion (display) adapted to present visual data to the person by using a smartphone when the support portion is supported on the person's head. A smartphone includes at least two imaging devices and a display, and is arranged on a frame and each imaging device obtains images of an environment around the person when worn on the person's head and images of the iris of the person. The smartphone is configured to control content of the viewable portion based on input received. At least one microphone is integral with the smartphone which detects audio communications. The smartphone processor monitors detection of audio communications detected by each microphone and images obtained by each imaging device when the viewable portion is displaying a test to determine whether a person other than the person on which the frame is supported is present or providing information to the test-taker, and determine that the test-taker is authorized to take the test.

In a second implementation using a smartphone, a method for detecting an attempt to physically alter the electronics assembly in accordance with the invention is a type of chassis intrusion detector (CID). In the method, a test device is enclosed by closely spaced film onto which is deposited a labyrinth of conductive wires comprising a continuous circuit. The resistance, capacitance and/or inductance of the circuit is monitored for a break in the circuit which would correlate with any attempt to breach the smartphone.

The security assembly, or chassis intrusion detector, includes a processor, a power source for providing power to the processor and a volatile RAM assembly containing a required security code, or private key, for use of the device for test-taking purposes. The security assembly is configured such that any attempt to disassemble the security assembly will break one or more wires connecting the power source to the RAM or cause a change in the capacitance, resistance and/or inductance, for example, relative to one or more thresholds, which will cause the security code to be erased from the RAM assembly. The security assembly is coupled to the electronics assembly which with the security assembly resides within the space enclosed by the wire labyrinth. An aperture is provided in the envelope defined by the wire labyrinth in which the electronics assembly is placed, the aperture permitting a wire to connect the smartphone to a power source for recharging. The film containing the wire labyrinth is sufficiently transparent to permit the camera to obtain images therethrough and permit viewing of the display by the test-taker.

An intrusion-protected electronic device in accordance with the invention includes an envelope defined by a wire labyrinth, that encloses the smartphone including the security assembly, and that periodically measures capacitance, resistance and/or inductance of the wire labyrinth. The security assembly is configured to monitor the measured capacitance, resistance and/or inductance to determine changes in one of these properties, with changes in any of these properties being correlated to an attempt to alter the device. Detection of the attempt causes a reaction to counter the attempt, e.g., destruction of memory or stoppage of a test.

Devices which can be part of the smartphone and which are designed to operate through the security film include one or more, or all, of the following:

1. A camera for obtaining iris, retinal or partial facial scans.
2. A microphone for monitoring sound in the vicinity of the test-taker.
3. A sound maker used for testing the microphone sensitivity.

BRIEF DESCRIPTION OF THE DRAWINGS

The following drawings are illustrative of embodiments of the invention and are not meant to limit the scope of the invention as encompassed by the claims.

FIG. 1 shows a smartphone positioned relative to the test-taker's face.

FIG. 2 illustrates a method for adjusting focal distance of a test device, forward and backward.

FIG. 3 shows a test device with mounted cross-view cameras and bone microphone.

FIG. 4 is a side view of a test device with a bone microphone and a cross-view camera based on a VR helmet design.

FIG. 16 illustrates an iris camera location and LED illumination for a special smartphone design.

FIG. 17 shows location of a smartphone relative to the test-taker's face.

FIGS. 18 and 19 show a special smartphone with iris camera on a side.

DETAILED DESCRIPTION OF THE PREFERRED EMBODIMENTS

Figure 5:
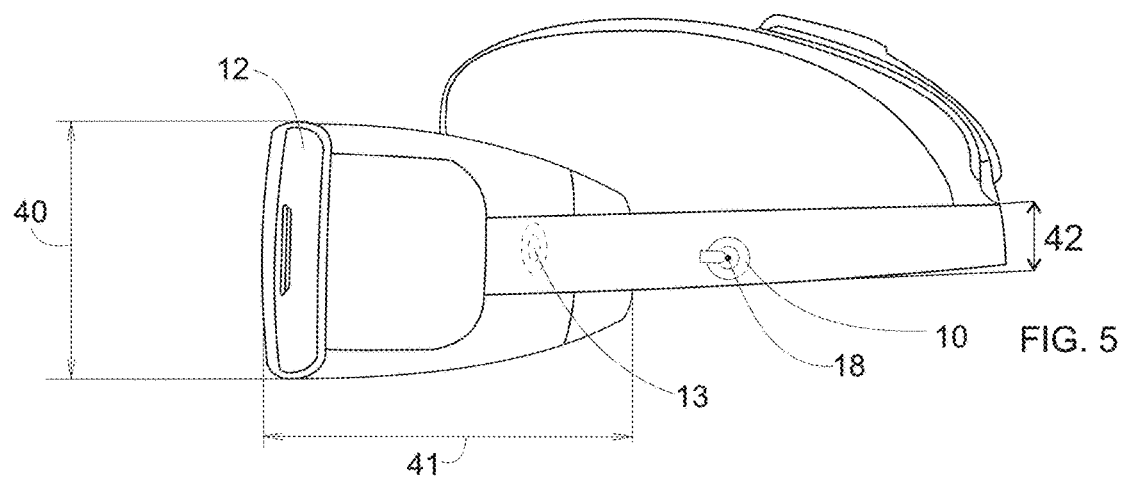
FIGS. 5 and 6 show a reduced-size test device.

The following drawings are illustrative of embodiments of the system developed or adapted using the teachings of at least one of the embodiments disclosed herein and are not meant to limit the scope of the disclosure as encompassed by the claims.

A concept of the invention is that a student located anywhere in the world ought to be able to obtain the equivalent of a degree from any college or university, providing that the student can prove that he or she has mastered the coursework. This proof naturally must come from the student passing a series of examinations. Since the student can be located anywhere in the world, it can be impractical and expensive for that student to travel to a particular place in order to take an examination.

A primary objective of this invention is to provide confidence to the degree-granting institution that a student taking a test is in fact the student who has registered for the course and that the student is acting alone without the aid of a consultant who may be remote or nearby. This assurance should be provided with a CID-protected smartphone with a probability of cheating reduced to on the order of one in 100,000 and, similarly, the false accusation that cheating is taking place reduced to a similar probability.

A student can typically learn the coursework on his or her own and in fact, studies have shown that for many students attending class is largely a waste of time. Over the Internet, a student can be exposed to the very best teachers providing well-constituted lectures, textbooks and other coursework. If this is done with a large number of students, the cost per student is minimal What is needed, however, is a method of verifying that a particular student has mastered the subject matter through taking and passing a particular examination, e.g., over the Internet or in a classroom, without cheating and at minimal cost to the institution.

Since the value of a degree from a prestigious institution can be immense, motivation to cheat when taking a test can be enormous. One can foresee, for example, an industry of consultants developing solely for the purpose of aiding students in taking tests and thus obtaining a degree. The inventive system minimizes the possibility of success of such consultants.

An objective of one or more embodiments of the invention is therefore to provide a system that is capable of ascertaining the identity of a test-taker with certainty and that cheating has not occurred during test-taking. Prior to discussing how these goals are achieved, an understanding of the cheating prevention process needs to begin with an analysis of the flow of information from the test-providing institution to the student's eyes. As used herein, a student is synonymous with test-taker as the test-taker will generally be a student.

An exemplifying, non-limiting worn device which meets the objectives of this invention is described below and is configured so that all of the functions necessary to identify the student and significantly reduce the opportunity for cheating are incorporated within the device design, hereinafter called the "Test Device". Another concept of the invention is to permit a classroom full of students to take a test without cheating.

This disclosure describes two designs of a Test Device:

a. A smartphone such as those oil the market today without any changes. The device comprises a frame for holding the smartphone on the student's head, such that the camera and the display of the smartphone can both only cover one eye. The display would only occupy a part of the screen. The smartphone can be mounted either horizontally or vertically. The frame therefore does not include significant processing capabilities, but rather includes only sensors and a connector module to connect the sensors to the smartphone when held by the frame of the device. The device thus differs from augmented reality and virtual reality wearable devices in that without the smartphone, it is unable to be used to display material since the display is provided by the smartphone, and typically the same situation for a processor.

b. A specially design smartphone for students which has a CID and a properly focused and located camera for iris recognition. A preferred location of the iris camera in the new smartphone is the bottom side where it has a direct view of the test-taker's iris.

An exemplifying device constructed in accordance with teachings of this invention is illustrated in FIG. 1 which is a perspective view of a head worn type device, the Test Device, containing a smartphone with several sensors and cameras. A head worn frame constructed in accordance with the invention is shown generally as an assembly at 11, with the attached or received smartphone 12, in FIGS. 1, 3 and 4. Assembly 11 includes the smartphone 12 removably retained by specific structure in connection with the device to cause it to be pointed toward the right eye of test-taker and that is controlled to display the test questions on its display (which is the only display of the combined frame and Test Device smartphone). If so desired, the assembly 11 could be structured to point toward the left eye of the test-taker.

To retain the smartphone 12, there is a receiving space, slot or aperture defined in the assembly 11 receiving the smartphone 12, possibly in a frame or housing of the assembly 11, and which are generally referred to as retaining means. For assembly 11, there is no CID illustrated (discussed below), although one could be provided in connection with the smartphone 12. The frame or housing of the assembly could extend around the head of the wearer and be made of one or more components or parts. For example, there may be a rigid structure at the front which retains the smartphone 12 and an elongate, elastic portion that is connected at each end to this rigid portion and extends around the head of the wearer.

At least one bone microphone 10 is provided on the frame or housing of the assembly 11 to monitor for talking which can take place while the test is in progress using the device. Talking is detected by analyzing sounds received by the bone microphone 10, usually, by a processor in the smartphone 12, and for which details about how talking is detected are not believed to be necessary in view of well-known voice recognition technologies. Talking can also be detected by a microphone on the smartphone 12.

A sound generator or speaker is provided to periodically provide a sound detectable by the bone microphone 10 so as to verify that the bone microphone 10 has not somehow been rendered inoperable. This is typically achieved by a processor in the smartphone 12 analyzing the received sound relative to the provided sound to detect accurate reception, or that an expected response to the generated sound is received. Other means for verifying working operation of the bone microphone 10 may also be incorporated into the smartphone 12 or the assembly 11 in general.

The test-taker is not permitted to talk while taking a test. Detection of talking by the test-taker could have consequences, such as invalidation of the test, invalidation of the question being displayed on the display of the smartphone 12, and the like.

A cable 19 emanates from the frame-mounted sensor assembly and can contain a USB connector 14 for connecting to the smartphone 12 (FIGS. 3 and 4). As shown, the cable 19 has one end at the rear of the frame or housing and is long enough to extend to the front of the housing to connected to the smartphone 12 when retained by the frame or housing. Cable 19 connects electronics in the frame or housing of the assembly 11 with the smartphone 12, when the free end of the cable 19 is connected to a mating port on the smartphone 12, and to the processor of the smartphone 12 since the processor of the smartphone 12 is controlling the operation of the bone microphone 10 and other electronic components on the assembly 11. There is thus an electronics unit in the frame or housing of the assembly 11, from which the cable 19 extends, or which includes a mating part for an end of the cable 19 (to enable the cable 19 to be removably connected at each end), and which also electrically connects to the bone microphone 10 and other electronic components, e.g., cross-view cameras 13 described below. These electrical connections enable the processor of the smartphone 12 to control operation of the bone microphone 10 and cameras 13, when the smartphone 12 is present on the frame.

One or more cameras 13 can be provided on the frame or housing of the assembly 11 to optically enable checking for any anomalous activity which might take place in the vicinity of the device. Such a camera 13 can detect whether an image capture device has been either temporarily or permanently affixed to the device or to the face of the test-taker which is capable of capturing the image on the display of the smartphone 12. This detection is performed by image analysis in ways known to those skilled in the art of image analysis. Similarly, camera 13 can monitor the space surrounding the eye(s) of the test-taker to assure that such an image capturing device and or another display for providing aid to the test-taker is not being employed by the student in conjunction with his eye. Each camera 13 is arranged on an inner side of the frame or housing, i.e., opposite to that side which faces away from the person when the device is being worn. The lens of each camera 13 thus opens or images inward toward the person, or toward the rear of the front portion of the frame or housing where the smartphone retaining means are located.

Smartphone 12 is mounted in a frame that positions it in front of the student in the same manner as many augmented or virtual reality (VR) devices. Differing from such devices, the smartphone 12 provides the display and the frame does not include its own display.

The bone microphone (contact microphone) position is shown as 10 in FIGS. 1, 3, 4. The bone microphone 10 presses against the cheekbone, or other convenient face bone, of the student. When the student talks, the bone microphone 10 picks up the sound but ignores all other surrounding sounds. Thus, the bone microphone 10 detects when the student talks, which is not permitted during the taking of the test. Note that the bone microphone need not be in contact with a facial bone and can work well when it is in contact with the cheek. As used herein, the term "contact" does not require touching because it is clear to those skilled in the art that the bone microphone cannot touch a facial bone since skin is normally between the bone microphone and the facial bone. Rather, it means that the bone microphone is situated opposite the facial bone to enable the bone microphone to be pressed against the facial bone, i.e., the bone microphone presses the skin against the facial bone. By contrast, when the bone microphone is in "contact" with the cheek, it touches the cheek since the cheek is the part of the face below the eye on each side of the head and includes the skin in this region. The hone microphone thus touches the cheek but does not touch the facial bone, but as used herein, may be in contact with both the cheek and the facial bone, i.e., direct (touching) contact in the case of the cheek and indirect contact in the case of the facial bone (it being considered that the bone microphone touches the outer surface of the skin overlying the facial bone and the inner surface of the skin with adjoining tissue touches the facial bone).

Another device such as a temperature sensor or pulse oximeter, not shown, can be collocated with the bone microphone 10, and detects that the bone microphone 10 is in contact with the face bone or skin.

One purpose of the bone microphone 10, or other sound receiving sensor, is to enable the test to be stopped by the processor on the smartphone 12 when any sound from the test-taker occurs. Bone microphone 10 is used to detect audio sounds and in particular spoken words. If any sound is detected emanating from student, then the test can be paused, terminated, or other action taken depending on the test-providing institution's requirements and instructions. Commands to take action when talking is detected are programmed into a computer program being executed by the processor in the smartphone 12 when conducting the test using the smartphone 12 when coupled to the assembly 11. Stoppage of a test may entail ceasing display of test questions on the display of the smartphone, which display is controlled by the processor of the smartphone 12.

In one embodiment, information as to what the response required of assembly 11 for this or any other anomaly can be sent in encrypted form from the test-providing institution. In order to prevent spoofing of these commands, when the device detects an anomaly, it can transmit a request for action to the test-providing institution via the Internet. The test-providing institution can respond with encrypted instructions as to what action to take.

In order to prevent the bone microphone 10 from being covered with sound absorbing material, a speaker or sound creator 16 is provided to periodically create a sound which can then be detected by the bone microphone 10 and the quality of the detected signal can be ascertained. As shown, speaker 16 is the speaker of the smartphone 12 itself, however, it is possible to provide another or alternative speaker on the frame or housing of the assembly 11. If the bone microphone 10 cannot clearly hear the sound produced by one or more of the speakers 16, then the test can be terminated or stopped until the issue is resolved. Speaker 16 may be alternatively placed at an alternate location on the Test Device in order to minimize direct sonic conduction through the structure.

Whenever mention is made of stopping a test herein, what occurs is that the display of the test questions on the display of the smartphone 12 ceases upon control of the display by the processor in the smartphone 12 and the test-taker is notified of the stoppage of the test in view of their attempt to cheat. This notification may be via the display of the smartphone 12 and/or via sounds from the sound speaker 16 of the smartphone 12 (or on the frame or housing of the assembly 11, see FIG. 11). A notification may also be sent using the communications unit of the smartphone 12 to the entity monitoring the test and/or the test-providing institution.

When the test-taker is speaking, vibration will be detected by the bone microphone 10 located at cheekbone or cheek of the test-taken when the test-taker is wearing the Test Device (FIG. 1).

The bone microphone 10 and cross-view camera(s) 13 can be built into the frame or housing of the assembly 11 and connected through a micro USB (or other type) connector on the cable 19 to the smartphone 12. Instead of a cable 19 other connecting means may be used, whether using wires or through wireless means and all such connection techniques are considered to be covered by connection means as used herein. Such connection means are designed to provide for data and communication connections when the smartphone 12 is present in connection with the frame and linked to the sensors on the frame.

FIG. 2 illustrates focal distance adjustment (forward and backward) 15 as it is used in existing VR helmets. Mechanics of the focal distance adjuster 15 and the manner in which it is integrated into the frame or housing of the assembly 11 are known to those skilled in the art to which this invention pertains.

FIG. 3 shows the device with the smartphone 12 onto a support member 34, contact or bone microphone 10, and cross-view cameras 13 mounted at the side of the device. Support member 34 may have an L-shape and extend from a front part of the frame or housing. The rear edge portion of the support member 34 is connected to the front part of the frame or housing and extends a distance that is close to the thickness of a smartphone and then extends upward a sufficient distance to provide secure retention of the smartphone. It is possible to provide the support member 34 with a spring to cause it to exert a rearward force against the smartphone 12 (toward the front part of the frame or housing) and thereby provide for better retention of the smartphone 12 in the assembly 11. Multiple support members 34 may be provided, either on the same side of the front part of the frame or housing or on different sides.

Microphone 10 and cameras 13 are connected through micro USB plug 14 on cable 19 into the smartphone 12. Cross-view cameras 13 are mounted with their field of view oriented toward the inside of the frame or housing and in front of the person wearing the device. Thus, the cross-view cameras 13 should be close to and preferably adjacent a front portion 32 of the frame or housing. A suitable distance might be about 1 inch to about 2 inches from the rear side or surface of the front portion 32.

A temperature sensor (thermocouple or thermistor) or pulse oximeter 18 (FIGS. 1, 4, 11) is optionally located in a common assembly with the bone microphone 10 to detect that it is touching the face (skin) of the test-taker when the device is being used by the test-taker. This detection is performed by the processor of the smartphone 12 which is electrically coupled to the sensor 18. Monitoring contact between the bone microphone 10 and the person taking the test will prevent attempts to insert a sound absorbing device between the test device and test-taker. Integration of the bone microphone 10 and the sensor 18 into a common housing is within the abilities of one skilled in the sensor art. Such integration allows for easier incorporation of the bone microphone 10 and sensor 18 to the frame or housing of the assembly 11, since a retaining structure may be provided in the frame or housing and the assembly of the bone microphone 10 and sensor 18 inserted, attached or retained in connection therewith.

Each cross-view camera 13 is positioned to enable an operative determination if there are other devices in view of the screen for transferring the information off of the device. The field of view of the camera 13 therefore preferably covers the display of the smartphone 12 when the smartphone 12 is retained in connection with the assembly 11 by the retaining means. The cross-view camera 13 is positioned to see such hidden cameras.

Similarly, a microphone in the smartphone 12 can be available to monitor the audio environment where the test-taking is occurring to detect audio communication with the test-taker by a consultant. The bone microphone 10 will pick up any oral communications from the test-taker and thus is a desirable part of the system to detect if the test-taker is orally reading the questions to a consultant.

In order to make sure that the bone microphone 10 has been activated, the speaker or other sound source 16 may be necessary to periodically create a sound which can be sensed by the bone microphone 10. Otherwise, the test-taker can cover the bone microphone 10 or otherwise render it useless. These and other methods and apparatus are discussed below but already it has become evident that the apparatus used to take the test preferably is especially designed to solve the issues mentioned above.

In order to make sure that the bone microphone 10 has been activated, a smartphone speaker 16 (FIGS. 3 and 4) or other sound source may be necessary to periodically create a sound which can be sensed by the bone microphone 10 and to make sure bone microphone 10 is not blocked. Otherwise, the test-taker can cover the bone microphone 10 or otherwise render it useless. The processor on the smartphone is connected to the speaker 16 to cause sound generation.

A bone speaker 17 can be located in proximity to the bone microphone 10, e.g., opposite the bone microphone 10, as another method to be used to test that the bone microphone 10 is properly attached and operating (FIGS. 3, 4, 21 and 22).

FIG. 4 is a side view of a test device 36 with bone microphone 10 and cross-view camera 13 based on a VR helmet design. The frame or housing of the test device 36 is provided with a slot into which the smartphone 12 slides, and has the general shape of a VR helmet. However, the test device 36 does not include a display and requires the presence of the smartphone 12 in the slot to provide the display. In this design, the retaining means would be one or more walls in the frame of housing that define a slot dimensioned to receive the smartphone 12 and which exert pressure against the smartphone 12 when retained to prevent it from falling or slipping out, whether alone or in combination with other structure. This structure may be part of the smartphone retaining means. Thus, it is possible to dimension the slot to exert a friction fit against the smartphone 12 or dimension the slot with a spring that is pushed inward when the smartphone 12 is inserted and exerts pressure against the smartphone 12 to maintain it in position in the slot. Test device also include other structure like the assembly 11 described above.

Figure 6:
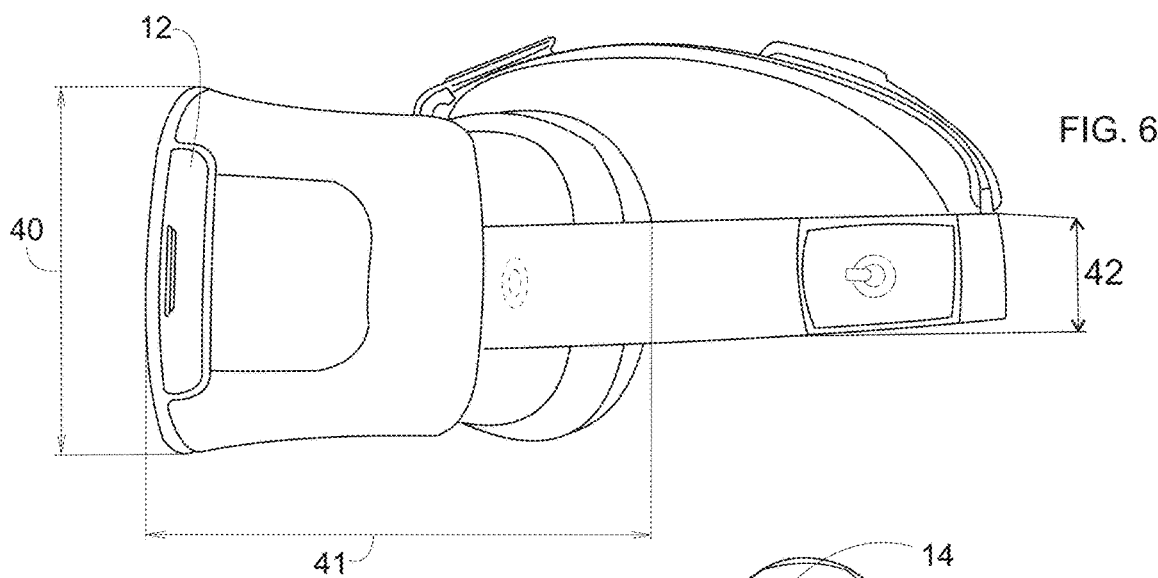

The frame design, not in the form of a VR helmet, should be as thin as possible to minimize the possibility of hidden cameras which could see the display of the smartphone 12, Such a hidden camera could transfer the image of the display to a consultant. A comparison of a standard VR helmet with the design disclosed herein is shown in FIGS. 5 and 6, where an installed smartphone is shown as 15 (FIG. 6 being similar to FIG. 4 but without showing the cable 19 and some other components). The goal is to reduce the size and weight of all parts of the device: height 40, length 41 (without the band that extends around the head of the wearer), and band height 42. Other simplified variants of supporting frames are shown in FIGS. 11-15.

FIG. 5 shows a design wherein the frame or housing has a height which is substantially the same as the width of the smartphone 12, since the smartphone 12 is positioned in a landscape configuration (with its longer side horizontal and short side vertical). It is also possible to reduce the length 41 since electronics and optics required for a VR headset are not required for the assembly 11.

Figure 7:
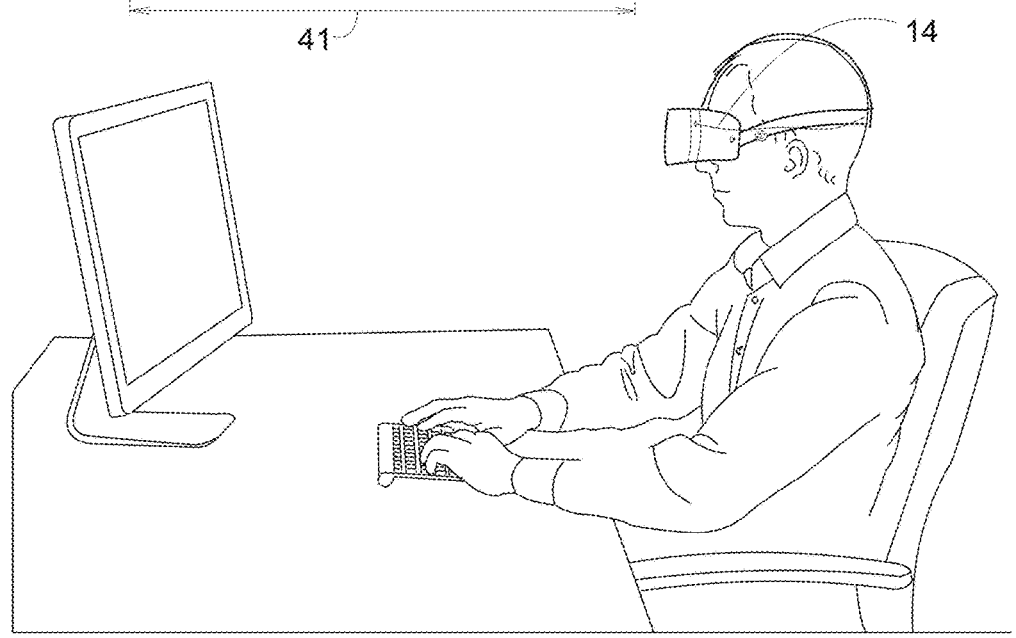
FIG. 7 shows a test-taker's position while taking of the exam.

FIG. 7 shows a test-taker taking an exam using the device, as in any of the configurations herein. This is an exemplifying, non-limiting use of the invention, and other uses of the invention are possible These uses may be different ways to securely take a test, meaning to enable a student to take a test while the test administrator has the ability to detect cheating, and for uses other than test-taking.

In preparation to take a test, the student is provided with access to a keyboard and/or a mouse for interacting with a computer or the display on the smartphone (generally exemplifying a user interface of which one or more may be provided). Using the keyboard or mouse, the student can initiate the test-taking process through communication with the test provider. When the test is ready for execution by the student, an encrypted version of the test is transmitted to the smartphone 12, e.g., via a communications network and cooperating communications systems on the smartphone and at the test source. The test source may be a repository of test material managed by the test administrator. The institution that has provided the education materials to the student would provide test questions to the test administrator to be stored in this repository until needed to be transmitted to the test-taker at the conclusion of the course.

The electronics within the smartphone 12 preferably utilize a private decryption key to decrypt the received test questions and display them on the display of the smartphone 12. The test-taker is able to view the questions on the display and then enters answers to the questions using the keyboard and/or mouse, and/or other user interface. It is possible to configure the processor of the smartphone 12 so that after each answer is received, another question is displayed on the display (a test-taker-controlled test), or after a certain amount of time has elapsed, another question is displayed (a timed test). The test is preferably configured such that the answers do not provide information as to the question. Therefore, someone viewing the answers cannot discern therefrom the questions. Therefore, the question answers do not need to be encrypted but can be sent in an unencrypted form to the test-providing institution, although encryption is an option.

Figure 8:
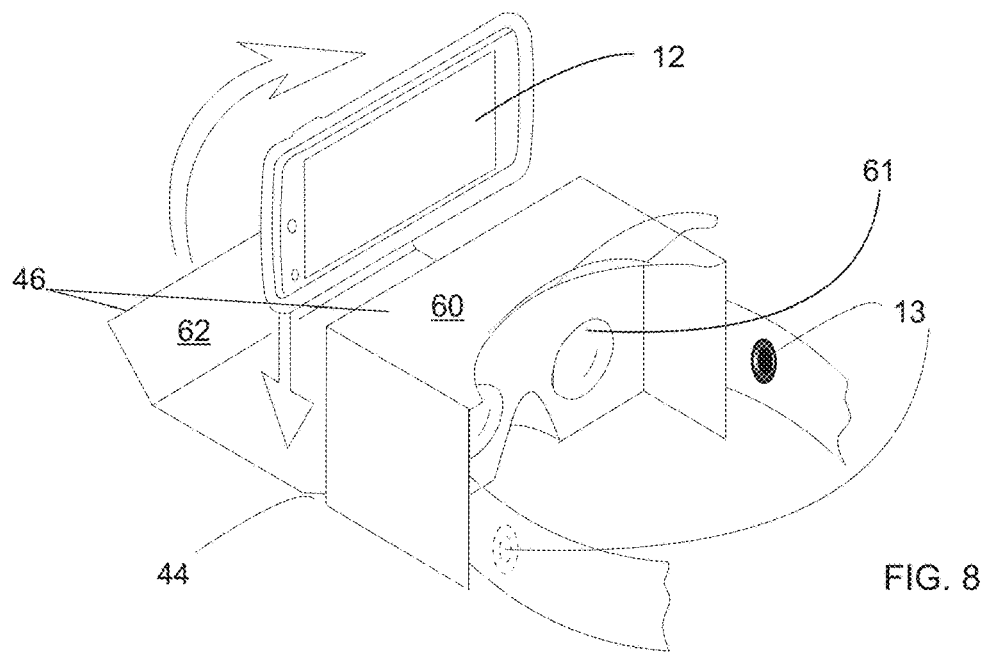
FIG. 8 is a test device based on a commercially available cardboard VR smartphone holder.
Figure 9:
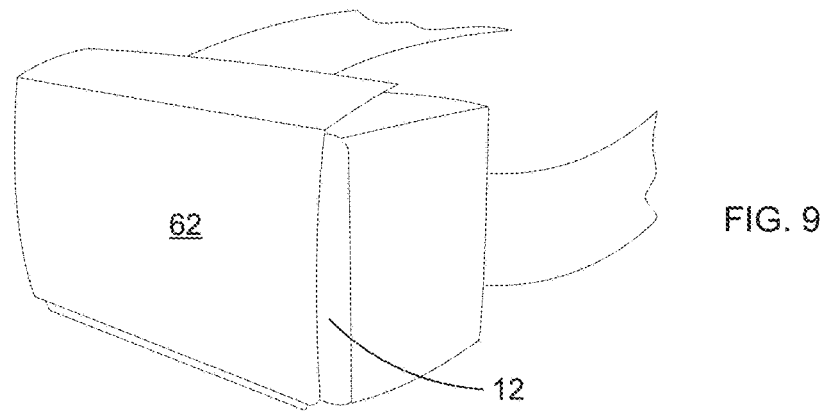
FIG. 9 is a rear view of the test device of FIG. 8.

FIGS. 8 and 9 show a device based on a cardboard frame 60. As represented by the arrows in FIG. 8, the smartphone 12 is inserted into a space between a back cover 62 and a frame 60 and covered by the back cover 62 attached to a remaining portion of the frame 60, for example, by cooperating hinge parts, a living hinge or other type of hinge mechanism (represented at 44 in FIGS. 8 and 10). Adhesive or hook and loop fasteners may be used to attach the back cover 62 to the frame over the smartphone 12 to provide the state shown in FIG. 9 (in the areas marked at 46 in FIGS. 8 and 10). Optional lenses, if needed, are positioned as shown as 61. Construction of a piece of cardboard to enable it to be folded to form the frame 60 and maintain a state retaining a smartphone is known to those skilled in the art to which this aspect of the invention pertains. Frame 60 can include or can be attached to a strap or belt to enable the frame 60 to be secured to a person. Any type of attachment structure to attach a cardboard frame 60 to a person may be used in the invention and is generally considered to be securing means. This encompasses straps and belts and similar devices that may be elongate and have cooperating attachment structure at one or both ends.

Figure 10:
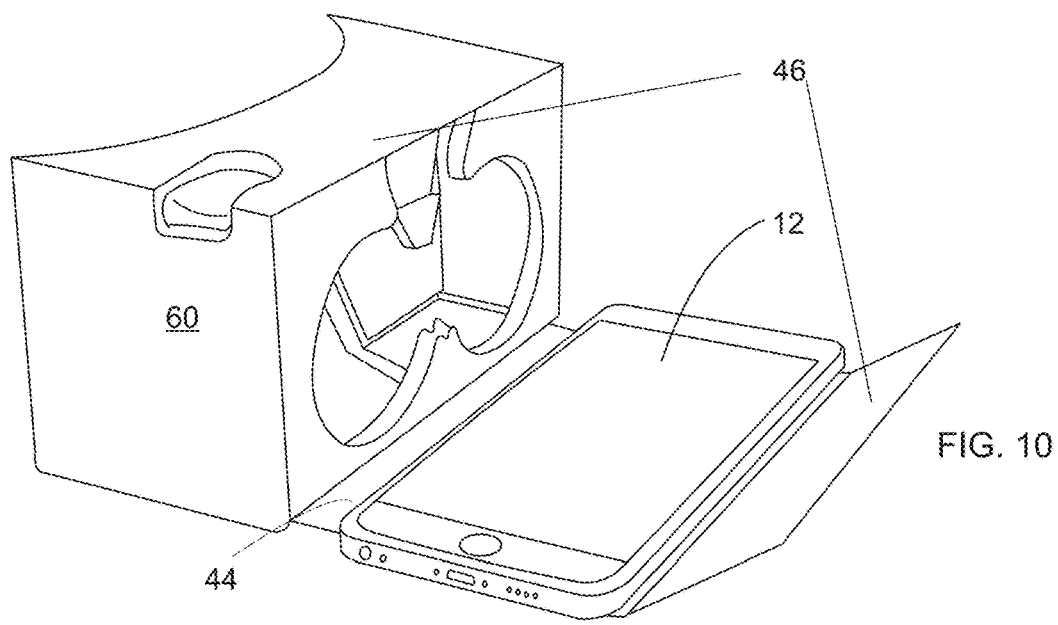
FIG. 10 shows a cardboard test device holder without lenses.

FIG. 10 shows the cardboard frame 60 without lenses 61. Rather, the cardboard frame 60 includes apertures to enable visualization of the display of the smartphone 12 when the frame 60 is worn by a person on their head. Smartphone 12 is lying on the back cover 62 with its display positioned to be oriented toward the eyes of the wearer when the back cover 62 is folded against the frame 60.

Figure 11:
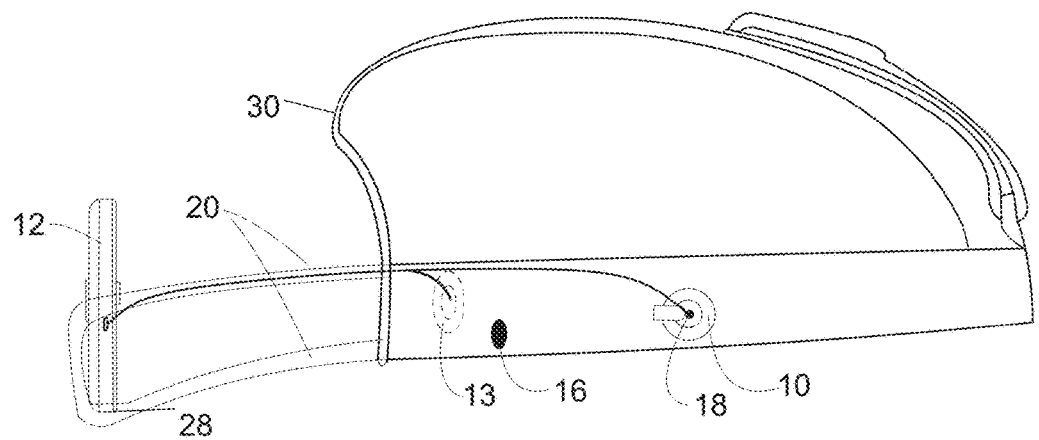
FIG. 11 is a test device design where the smartphone is held by thin metal frame.

Different variants of thin metal frames 20 instead of a cardboard helmet are shown in FIGS. 11-15. FIG. 11 shows metal frame 20 including a channel 28 into which the smartphone is placed, with the bone microphone 10, cross-view camera 13, speaker 16 and sensor 18 on the metal frame 20. A brace 30 is attached to the metal frame and extends over the wearer's head to retain the metal frame 20 on the wearer's head.

Figure 12:
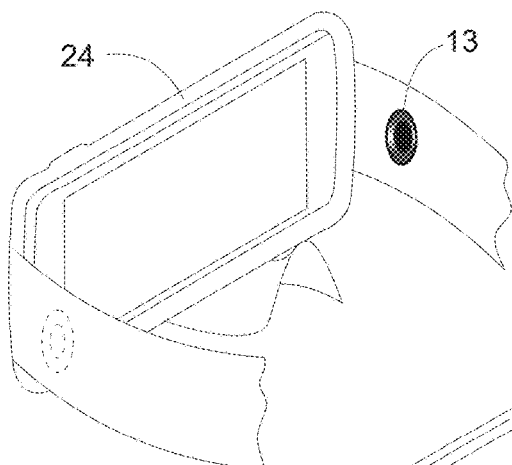
FIG. 12 is a simplified version of the device shown in FIGS. 4 and 6.

Plastic frame 24 variant is shown in FIG. 12 where the smartphone 12 is inserted just as in an ordinary smartphone plastic case, e.g., into a compartment configured with substantially the same dimensions as the smartphone.

Figure 13:
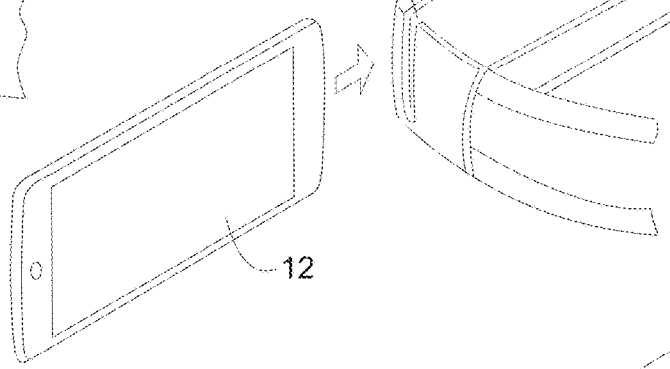
FIG. 13 is another variant of the frame of FIG. 12.

FIG. 13 shows another variant of plastic frame 26 where smartphone 12 is inserted from a side groove 25 into the compartment. Groove 25 has a closed bottom end and an open upper end and is formed on only one side of the frame 26.

Figure 15:
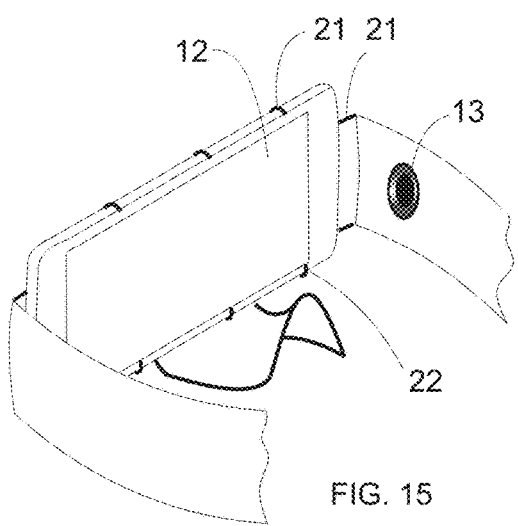
FIGS. 14 and 15 show the device where the smartphone's frame is made using a thin metal wire carcass.
Figure 14:
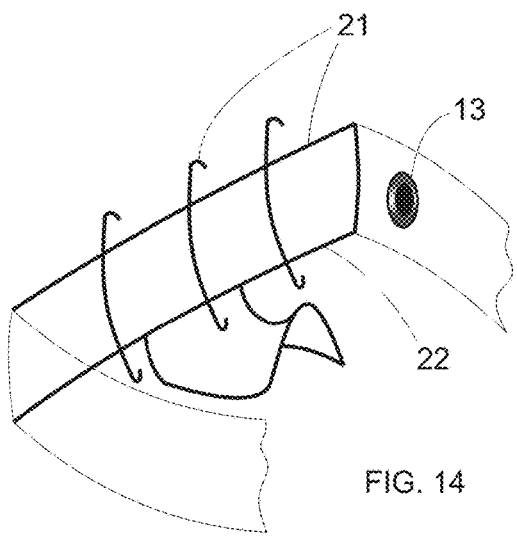

The smartphone supporting carcass 22 (frame or housing) can be designed from thin aluminum, or other metal, or wires 21 as shown in FIGS. 14 and 15. The smartphone 12 mounted in wire carcass 22 is illustrated in FIG. 15. Wires may form one or more loops of material around the carcass 22 and that press against a backing plate and the smartphone 12 may be inserted between the wires 21 and backing plate in a position in which the wires 21 do not obstruct the display (see FIG. 15).

From FIGS. 11-15, it should be realized that the construction of the frame, housing or carcass of the assembly 11 is not limited to any particular construction and numerous variations are possible and considered to be within the scope and spirit of the invention. Generally, all that is required is a support that includes a channel into which a smartphone 12 can be slid, compartment into which a smartphone 12 can be placed, a retainer onto which smartphone 12 is placed and retained thereby, a wire frame that receives and retains a smartphone 12, an elastic member that expands to accommodate a smartphone 12 and then securely retains the smartphone, and/or other comparable retaining structures, devices and apparatus, To monitor an iris 101 of the student, a special iris camera 100 on the special smartphone can be used (FIGS. 16, 18 and 19). The invention thus encompasses construction of a new smartphone, in particular, for test-taking purposes, Illumination of an iris camera 100 is achieved using one or more LEDs 102 on the phone, which are preferably infrared LEDs if the camera is IR sensitive (see FIG. 16). Other variants of arrangement of LEDs, in position, location and number, are possible. An exemplifying, non-limiting position of the smartphone 12 where the iris camera 100 can capture the student's iris is shown in FIG. 17. A plane of the iris camera surface may not be in the plane of the smartphone. This difference is shown by the alpha angle 103, due to which camera's field-of-view angle 104 will cover the test-taker's eye. The camera 100 will cover the field of view of the student.

Construction of a smartphone to include a camera 100 and the LEDs 102 is within the ability of one skilled in the art of smartphone construction. Basically, the screen is altered from a traditional rectangular shape to accommodate the iris camera 100 and one or more adjacent LEDs 102. The smartphone would include a housing, electronics in the housing (including a processor, communications unit, display processor, touch screen, etc.) and in particular for the embodiment of the invention shown in FIG. 16, the iris camera 100 in an approximate middle area between the upper and lower edges of the housing, in the longer dimension. As such, when the test-taker views the display, the iris camera 100 is between the test-taker's eyes. In the embodiment of FIG. 18, a smartphone is used which has the iris camera 100 at the upper or lower edge region (in an approximate middle area between the lateral edges in the shorter dimension). In the embodiment of FIG. 19, a smartphone is used which has the iris camera 100 at the upper or lower edge region, and in a corner. The retaining means in the frame or housing may be adjusted based on where the iris camera 100 is on the smartphone.

Iris scan. Iris scan verification is as follows. Iris imaging camera 100 takes an image of the student's iris and transmits the image to a memory component in the frame or housing of the assembly 11. Monitoring of the pupil size over time and detection of changes in size through this monitoring can be used to guard against the student wearing contact lenses containing a printed iris. Other biometric measurements can be made in a similar manner such as a retinal image or an image of blood vessels in the student's face. For the purposes herein, the word iris will be used to represent all such biometric measurements. If the iris comparison test is passed indicating that the student is recognized and permitted to take the test, the test decryption and display process proceeds further. If the iris test fails, then the student is notified to adjust the device and the counter is incremented. The count is checked and if it is below the maximum established by the test-providing institution, then the test is repeated. If the count is at a maximum, then the test-taking process is terminated.

Iris camera 100 will continue to monitor the student's eye, and if at any time the iris is not detected, then the display is turned off until the iris reappears. This might happen if the student removes the device from his or her head to take a break, for example. After such a break and at other random times, the iris check can be repeated to ascertain that the same student is using the device. Thus, the continued test-taking process is monitored to guard against the change of the test-taker or any attempt to make the display visible by anyone other than the authorized student. Periodic checking of the presence of the iris in the proper location also prevents the rotation of the display to where a hidden camera can see it.

A processor is housed in the frame or housing and is coupled to the iris camera 100 and the memory component, as well as the LEDs 102 to coordinate illumination of the iris when images are being obtained by the iris camera 100. The processor performs the functions described above, i.e., takes an initial image of the iris, compares subsequent images to the initial image, determines any differences between the subsequent images and the initial images, and generates a signal indicating a change. The processor also detects when the iris camera 100 does not receive an image of the iris and after having received an initial image, generates a signal indicating that the device has been removed or requires adjustment.

At the end of the course or when the student completes his relationship with the institution, he or she may be required to return the device assuming that the student owns the smartphone so only the device would be returned.

Figure 23:
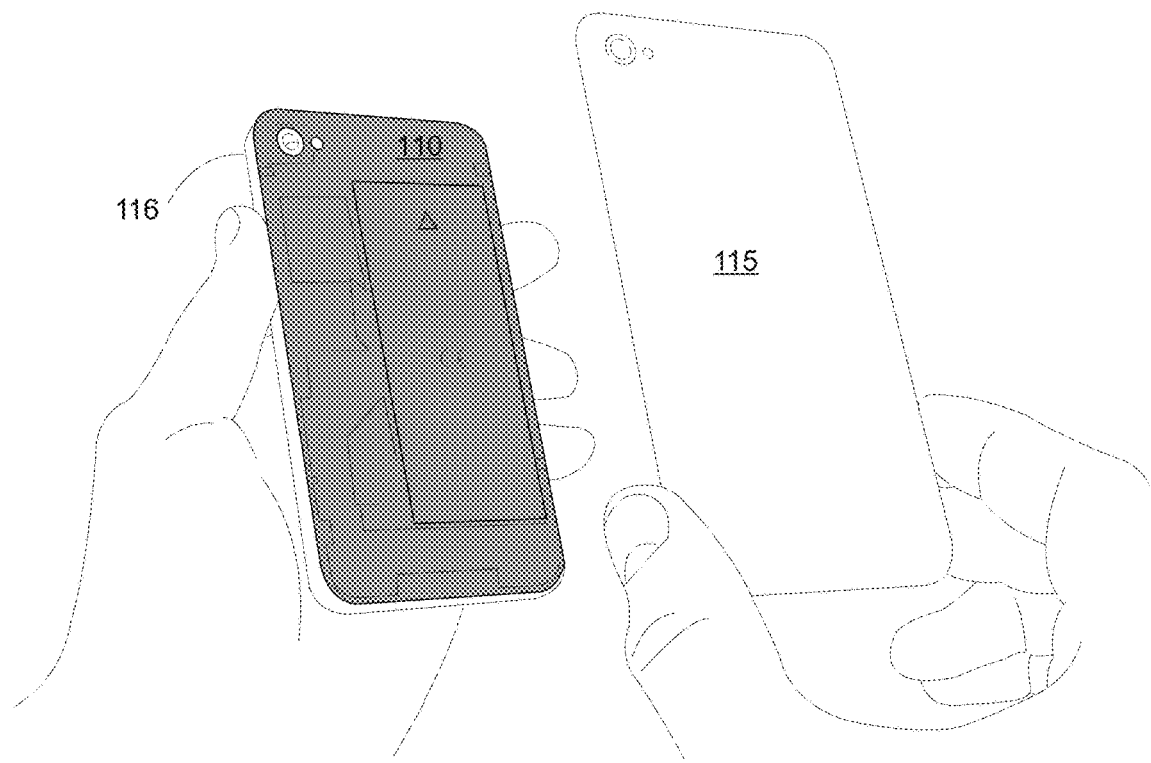
FIG. 23 shows a CID film, which covers internal part of the smartphone.
Figure 24:
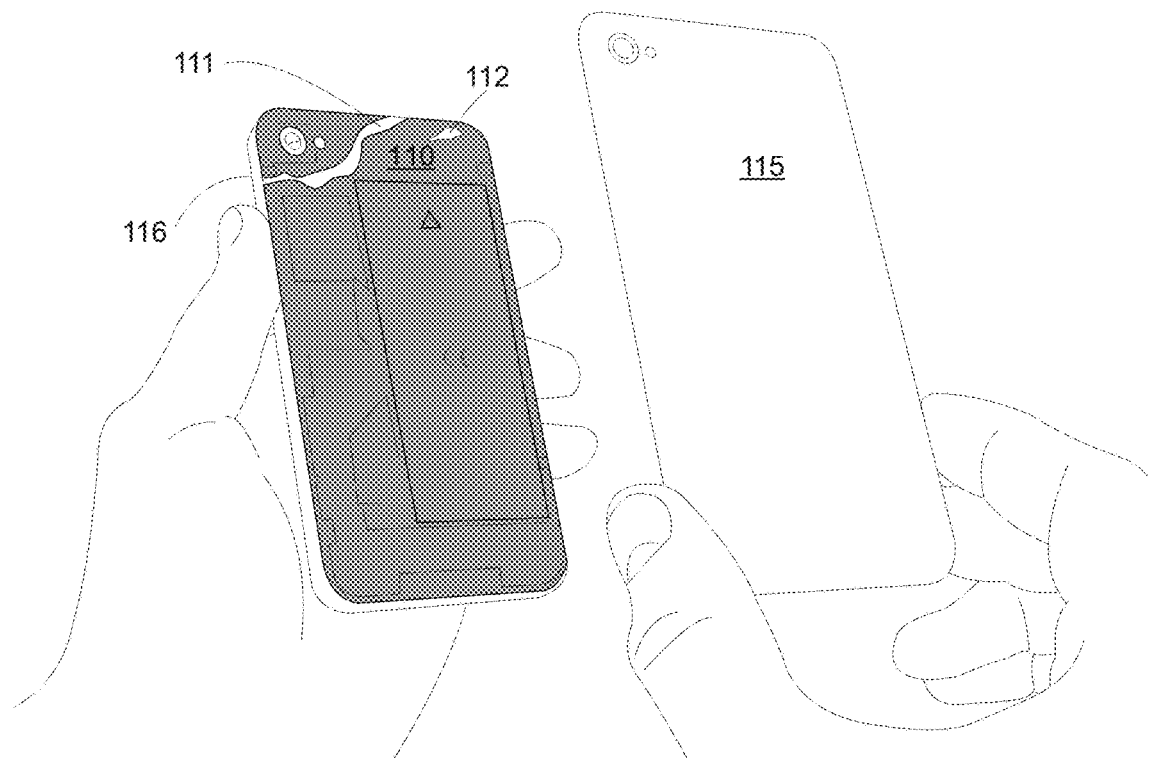
FIG. 24 shows an attempt to intrude inside the smartphone

CID. The entire smartphone in the case of a special smartphone is preferably encapsulated during manufacture by a thin film 110 called a chassis intrusion detection film (FIGS. 23 and 24). Film 110 can comprise an array of wires which can be printed onto a transparent plastic film during manufacture in such a manner that any attempt to break into the smartphone will sever or otherwise disrupt one or more of the wires. The wires can be made from indium tin oxide and thus be transparent. The wires can be thin, such as from about 0.002 to about 0.005 inches wide, and have a larger spacing so that the wires do not unduly obstruct the view of the display if they are not transparent.

FIGS. 23 and 24 show the thin film 110, which covers the internal space of a smartphone 116. The removed smartphone cover is shown as 115. An attempt to intrude into smartphone's interior will lead to damage, represented as 111, 112, to the film 110 breaking one of the wires. Wire breakage can lead to deletion of data in the smartphone.

Figure 20:
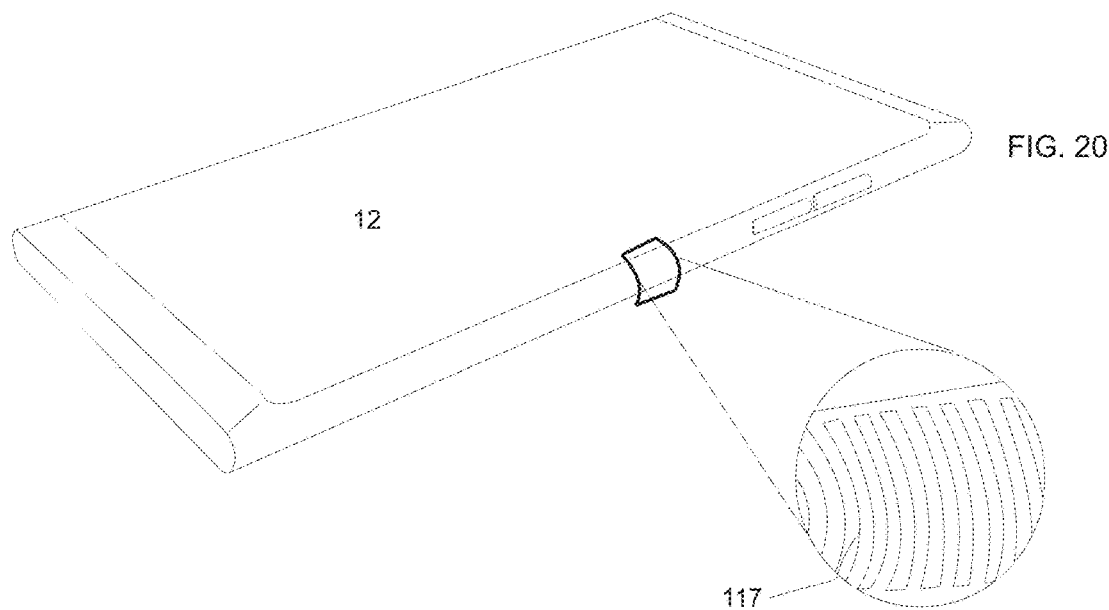
FIG. 20 is a smartphone CID in a form of wire labyrinth.
Figure 21:
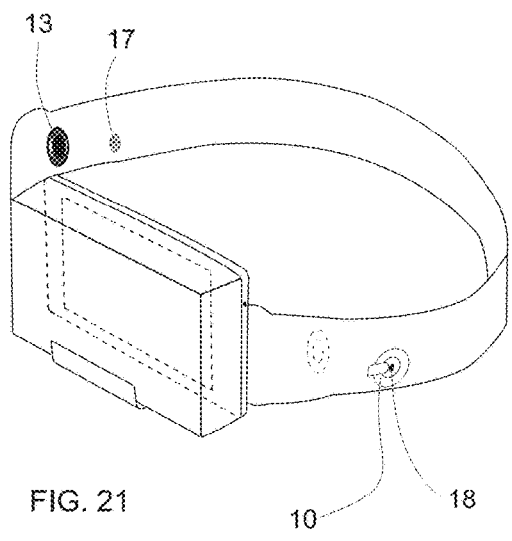
FIGS. 21 and 22 show a bone speaker location that is opposite to the bone microphone.
Figure 22:
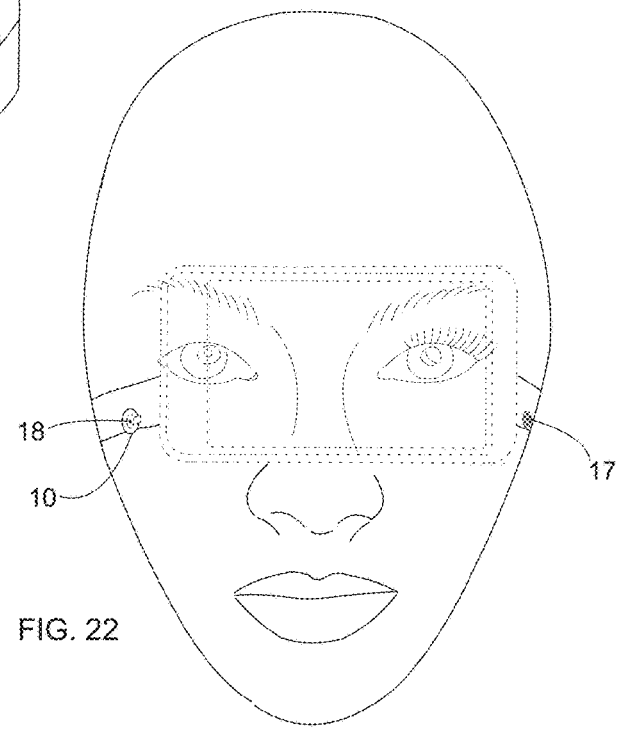

A variant is an internal CID smartphone cover in a way of a wire containing thin transparent plastic film. This transparent film contains a wire labyrinth 117 and it is shown in FIG. 20.

Other chassis intrusion detection systems may be used in the invention, including those known to person skilled in the art and earlier chassis intrusion detectors disclosed by the inventors and assignee.

A private key for decoding the test questions, or other security information, and any other commands sent by the test providing institution can be held in volatile RAM memory which is kept alive through an extended life (10 years) battery which also can be recharged when the device is connected to a power source through a connector. If the chassis intrusion detector system detects an attempt to break into the smartphone (e.g., wire breakage), then power to the RAM can be shut off and the private key or other security based information is permanently lost.

When the test-taker is preparing to take a test, he or she will place the Test Device onto his or her head. When this happens for the first time, attributes of the retinal, iris or other biometric scan will be recorded in a memory component on the frame or housing or in the smartphone for later comparison and sent to the test-providing institution via a communications unit of the smartphone. When this is accomplished, a signal can be sent to the appropriate Internet server indicating that the test-taker is ready to take the examination.

When the test-taker engages in taking a second test at a later time, a new biometric scan will be conducted to ascertain that this is the same person who originally registered using this or a similar approved device. This entails using a processor to compare the current biometric scan to biometric data from a previous scan stored in a memory component. If this scan comparison is successful, then the display will be activated and a signal can be sent to the test provider via the Internet to forward the encrypted test to the smartphone via its communications unit. The biometric scan camera will periodically check to ascertain that the test-taker's iris is present and that it has not changed (or is not present). If anything anomalous occurs such as the absence of an iris or the change of an iris, as detected by a processor receiving input from the iris camera 100, then the display will be deactivated. Thus, when the student removes the device, the display will automatically stop displaying the test questions. Similarly, if the student transfers the device to another person whose iris does not match that of the student, then the display will not show the test questions. Above and in what follows, iris will be used to represent any of the aforementioned biometric scans.

Since the chassis intrusion detector is designed to encompass the entire smartphone, it must be relatively thin so as not to interfere with the microphone and speaker, and be sufficiently transparent such as to not interfere with the display or cameras. To summarize, any disruption of the wire mesh will destroy the private key or other security information making it impossible to decode the test questions. After the assembly is completed, the smartphone can be powered on and the first step would be to measure the resistance of the mash. Thereafter, if any of these measurements significantly change, then the circuit in the security assembly would remove power from the RAM thereby destroying the private key and/or other security related information. Since the private key or other security information cannot be reloaded, the assembly would need to be returned to the factory for remanufacture and the insertion of a new security assembly.

The embodiments of the invention described above include securing means for securing the frame of the assembly to a head of a person. The invention also contemplates securing the frame of the assembly, additionally or alternatively, to another part of the person so that the display of the smartphone when retained by the frame is in front of one eye of the person, or alternatively both eyes. Such a securing structure that secures the frame in this manner may be designed to engage with the person's shoulder, neck, arm, etc. Such securing structure would be readily constructed by one skilled in the art to which the invention pertains.

Preferred embodiments of the invention are described above and unless specifically noted, it is the applicant's intention that the words and phrases in the specification and claims be given the ordinary and accustomed meaning to those of ordinary skill in the applicable art(s). If the applicant intends any other meaning, they will specifically state they are applying a special meaning to a word or phrase.

In the context of this document, computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

The invention represents an innovation in a relatively new field. While smartphones existed in the early 2000s, it was not until 2010s that technology allowed for smartphones to be placed close to a person's eyes. This is commonly done by splitting the image into two frames and using lenses, but it was not easy to achieve acceptable image quality with earlier display technologies and screen resolutions lower than 480p. As such, virtual reality (VR) and augmented reality (AR) devices mostly focus on creating their own specialized displays and frames.

Two main branches of frame design developed. AR devices mostly uses lightweight "see-through" glasses-integrated displays which allow users to better view the environment. The frames also often employ sophisticated electronics, microphones and eye-tracking cameras. VR devices on the other hand generally use bulky frames that block incoming external light. Only heavier "VR style" frames can accommodate a smartphone. The smartphone itself integrates main features of a desktop computer (processor, memory, data storage) in addition to camera and microphone. The extreme of this design philosophy is the "Google Cardboard"—a frame literally made of cardboard. A drawback of such frames is that front cameras of commercially-available smartphones cannot effectively function inside the headset (due to low light and short focus distance), making eye tracking and iris recognition difficult.

In spite of the dearth of prior art in the same field as the invention, some will be mentioned including US 20160005232 which describes an underwater mask/smartphone frame having an integrated smartphone camera and microphone used for various control operations, US 20170156965 which describes an integrated smartphone camera and light pathway (using beam-splitter) used for gaze detection, US 20170206708 which describes a VR gaming device with detachable external control module and only smartphone sensors, and US 20180075764 which describes a heartbeat sensor integrated into the frame. Additionally, mention is made of US 20180160105 and WO 2018102122A1. Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A wearable device, comprising:
   a frame including retaining means for removably retaining a smartphone including a display;
   securing means for securing said frame to a person;
   at least one microphone arranged on said frame when said retaining means are not retaining the smartphone;
   at least one camera arranged on said frame when said retaining means are not retaining the smartphone and oriented to image an interior region of the device; and
   a cable attached at one end to said frame and having a connector at an opposite end, said connector being adapted to detachably couple to the smartphone when the smartphone is retained by said retaining means,
   whereby a processor in the smartphone controls said at least one microphone and said at least one camera when the smartphone is coupled to said at least one microphone and said at least one camera through said cable when the smartphone is retained by said retaining means.

2. The device of claim 1, wherein said at least one microphone comprises a bone or contact microphone.

3. The device of claim 1, wherein said frame has an outer side facing outward away from said frame and an inner side on an opposite side of said frame from said outer side, each of said at least one camera having a lens exposed for imaging on said inner side of said frame.

4. The device of claim 1, wherein said at least one camera comprises two cameras on opposite sides of said frame.

5. The device of claim 1, further comprising a temperature sensor or pulse oximeter on said frame that detects presence of a wearer of said frame.

6. The device of claim 1, wherein said retaining means comprise a support member extending forward from a remaining portion of said frame.

7. The device of claim 1, wherein said frame is a cardboard frame, said retaining means comprising a back cover hingedly connected to a remaining portion of said frame.

8. The device of claim 1, wherein said frame is a thin metal frame, said retaining means comprising a channel formed on said frame, said securing means comprising a brace.

9. The device of claim 1, wherein said frame is a plastic frame, said retaining means comprising a compartment having substantially the same dimensions as the smartphone.

10. The device of claim 1, wherein said frame is a plastic frame, said retaining means comprising a side groove and a compartment communicating with said side groove.

11. In combination, the device of claim 1 and a smartphone, the smartphone including a sound generator coupled to the processor, the processor analyzing sound received by said at least one microphone relative to sound generated by said sound generator to determine operability of said at least one microphone.

12. A method for administering a test using a smartphone when in connection with and coupled to a wearable device on a person's head in a position in which the person is considered to be wearing the device while a display of the smartphone is visible to the person when wearing the device, comprising:
   comparing, using a processor on the smartphone, biometric data of the person wearing the device obtained using a biometric data device to biometric data of an identity of a person supposed to be taking the test obtained from a memory component to determine whether the identity of the person wearing the device is the same as the identity of the person supposed to be taking the test;
   when the identity of the person wearing the device is determined to be the same as the identity of the person supposed to be taking the test,
      conducting, using the smartphone while the smartphone is coupled to the device, the test for the person wearing the device by displaying test questions on the display, receiving answers to the test questions via a user interface, grading the test based on comparison of the received answers to correct answers, associating the grading of the test to the person wearing the device, communicating the grading of the test to a test-providing institution, and storing the grading of the test in the memory component or an additional memory component in association with the identity of the person wearing the device;
      monitoring, using the processor on the smartphone, presence of the device on the head of the person wearing the device by periodically obtaining biometric data from the person wearing the device and analyzing a change in the biometric data relative to previously obtained biometric data for the person wearing the device; and
      when a change in the biometric data is present, causing the processor to stop display of the test questions on the display, and generate and transmit a communication, using the smartphone, to the test-providing institution derived from the change in biometric data indicating this change in biometric data; and when the identity of the person wearing the device is not determined to be the person supposed to be taking the test based on the comparison of biometric data, communicating, using the smartphone, an indication of cheating with the identity of the person supposed to be taking the test to the test-providing institution and optionally indicating to the person supposed to be taking the test and/or the person wearing the device via a notification device that the person supposed to be taking the test is cheating.

13. The method of claim 12, further comprising:
monitoring, using a microphone and while the person is wearing the device and the smartphone is coupled to the device, talking by the person wearing the device; and
causing the processor on the smartphone to stop display of the test questions on the display, and generate and transmit a communication to the test-providing institution, using the smartphone, when the person is talking.

14. The method of claim 13, further comprising:
periodically checking operability of the microphone by generating a sound with known properties,
   monitoring, using the processor on the smartphone, the microphone for receiving sound,
   considering the microphone operable when the processor on the smartphone determines that the received sound is an expected response to the generated sound and then continuing the periodic checking of the operability of the microphone, and
   considering the microphone inoperable when the received sound is not an expected response to the generated sound and then causing the processor on the smartphone to stop display of the test questions on the display and generate and transmit a communication, using the smartphone, to the test-providing institution about the inoperability of the microphone.

15. The method of claim 13, wherein the microphone is a bone microphone and is on the device, and wherein the step of placing the device onto the person's head into a position in which the person is considered to be wearing the device comprises positioning the device to cause the bone microphone to press against a bone or skin of the wearer; the method further comprising
   detecting that the bone microphone is against the bone skin of the wearer by monitoring a temperature sensor or pulse oximeter collocated with the hone microphone on the device.

16. The method of claim 12, further comprising:
imaging an area between the display and the wearer's eye while the person is wearing the device using at least one cross-view camera;
analyzing, using the processor on the smartphone, the images from the at least one cross-view camera to determine if any optical devices are present; and
when an optical device is determined to be present based on the analysis of the images from the at least one cross-view camera, generating and transmitting a communication, using the smartphone, to the test-providing institution about the determined presence of the optical device.

17. The method of claim 12, wherein the step of monitoring presence of the device on the head of the person by periodically obtaining biometric data from the person wearing the device and analyzing a change in the biometric data relative to previously obtained biometric data for the person wearing the device comprises obtaining, using at least one camera, an image of an iris of the person and analyzing, using the processor on the smartphone, the obtained image relative to a previously obtained image of the same person.

18. The method of claim 12, wherein the smartphone includes a memory component storing data to enable displaying of the test questions, and a chassis intrusion detection system that includes a chassis intrusion detection film surrounding a housing of the smartphone, the chassis intrusion detection film including a plastic film having a transparent portion that overlies the display and an array of wires on the plastic film and forming at least one circuit; the method further comprising:
   deleting data necessary to enable displaying of the test questions from the memory component in the smartphone when a change in resistance, capacitance and/or inductance of the at least one circuit is detected indicative of breakage of one of the wires in the array of wires.

19. A wearable device, comprising:
a frame defining a receiving space into which at least part of a smartphone is situatable;
an elongate device attached at ends to said frame to define a space on an inside of said elongate device;
at least one microphone on said frame when no part of the smartphone is situated in said receiving space;
at least one camera on said frame when no part of the smartphone is situated in said receiving space and oriented to image the space on the inside of said elongate device; and
connection means on said frame for connecting said at least one microphone and said at least one camera to a processor on the smartphone;
whereby the processor in the smartphone controls said at least one microphone and said at least one camera when the smartphone is coupled to said at least one microphone and said at least one camera by said connection means when the at least part of the smartphone is situated in said receiving space, and
whereby said frame is positionable on a head of a person by placing said elongate device around the person's head.

20. The device of claim 19, wherein said connection means comprise a cable extending from said frame and having a connector adapted to detachably couple to the smartphone when the at least part of the smartphone is situated in said receiving space.

* * * * *

UNITED STATES PATENT AND TRADEMARK OFFICE
CERTIFICATE OF CORRECTION

| | |
|---|---|
| PATENT NO. | : 11,508,249 B1 |
| APPLICATION NO. | : 16/290529 |
| DATED | : November 22, 2022 |
| INVENTOR(S) | : David S. Breed et al. |

It is certified that error appears in the above-identified patent and that said Letters Patent is hereby corrected as shown below:

In the Claims

Claim 15, Column 17, Line 45, after "against the bone", insert --or--.

Signed and Sealed this
Twentieth Day of December, 2022

Katherine Kelly Vidal
*Director of the United States Patent and Trademark Office*